Jan. 10, 1939. T. P. McFADDEN Re. 20,976
METHOD OF DEGREASING AND CLEANING BY VAPOR CONDENSATE
Original Filed July 13, 1934
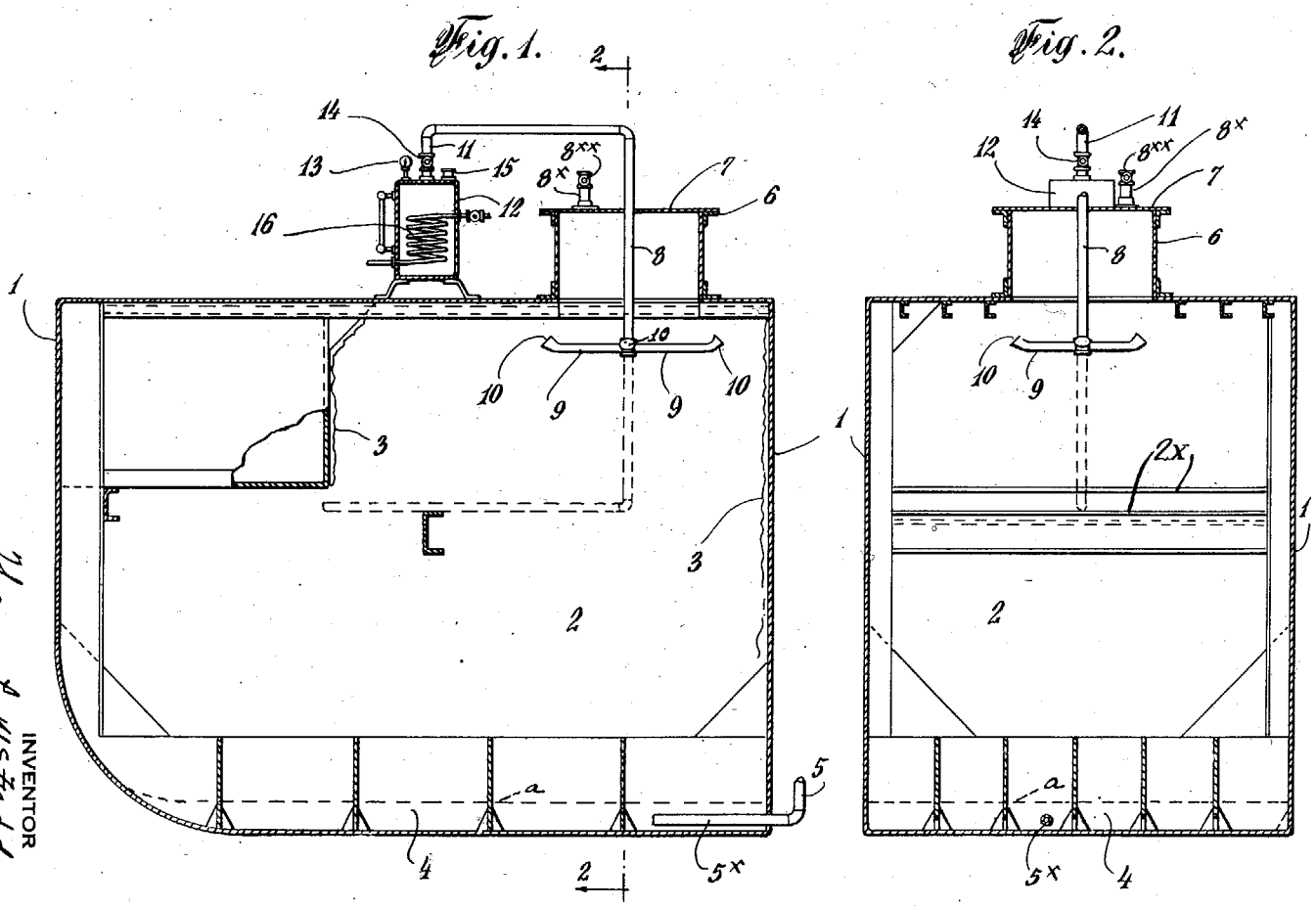
INVENTOR
Thomas P. McFadden
BY
H. Lee Helms
ATTORNEY Reissued Jan. 10, 1939

Re. 20,976

UNITED STATES PATENT OFFICE 20,976

METHOD OF DEGREASING AND CLEANING BY VAPOR CONDENSATE

Thomas P. McFadden, New York, N. Y., assignor, by mesne assignments, to Alexander C. Dick, trustee, New York, N. Y.

Original No. 2,092,321, dated September 7, 1937, Serial No. 734,900, July 13, 1934. Renewed December 23, 1936. Application for reissue December 8, 1937, Serial No. 178,758

4 Claims. (Cl. 141—1)

This invention relates to a method of degreasing and of gas freeing and is an improvement on the known processes which attempt to secure vapor condensate cleaning, as shown in the Freeman Patent No. 1,832,697 and Murphy Patent No. 529,338. This application is a continuation in part of my earlier application Serial No. 555,509, filed August 6, 1931.

As in other methods, I use a generator containing any oil or grease solvent, such as trichlorethylene, with a steam coil or other source of heat for vaporizing the solvents, and with a pipe of ample dimensions from the generator to conduct the vapor to the tank wherein the degreasing takes place.

My process from this point differs from all others and will be described in connection with the cleaning of a ship's tank, as shown in the drawing wherein—

Fig. 1 illustrates in cross-section a tank of a usual construction, and

Fig. 2 illustrates the same in longitudinal section, both figures showing the tank with other elements of the vessel having applied thereto apparatus for carrying the method into effect.

In the figures, the hull of a ship is indicated at 1 and the tank at 2, 2x indicating splash or baffle plates. 3 indicates a heavy viscous deposit left by fuel oil contained within the tank and drained therefrom, and 4 a body of oil or residue left in the tank and extending to the dotted line a. At 5 is indicated a drain pipe having a branch 5x leading to the exterior of the tank.

At its top, the tank is provided with a manhole at 6 having the customary removable cover 7. Projecting through a hole in the manhole cover 7 and one or two feet into the tank is a pipe 8 having at its lower end a T fitting with branch pipes 9, each pipe carrying a frusto-conical discharge head 10.

Also projected through a hole in the manhole cover 7 or other upper portion of the tank, is a vent pipe 8x having a controlling valve 8xx, there being no other open outlet from the tank.

Pipe 8 is connected to a vapor feed conduit or pipe 11, one end of which projects within the top of a generator including a heating chamber 12 having a pressure gauge 13 and a safety or relief valve 15. The conduit 11 is provided with a regulating valve 14. Within heating chamber 12 of the vapor generator, a steam coil 16 having suitable valve controls for admitting and shutting off steam is employed to vaporize the solvent placed within the generator.

As an example of operation of the method on a marine fuel tank of 120,000 gallon capacity, having wall and baffle hydrocarbon deposits, the deposits on the inner surfaces of the plates of the tank being of heavy viscous character, I heat 100 gallons of solvent, such as trichlorethylene or carbon tetrachloride within the generator to build up a pressure of 50 to 100 pounds per square inch of solvent vapor therein. The vent valve 8xx in the tank vent pipe 8x being closed, I open the generator or vapor conduit valve 14 quickly, thus admitting the solvent vapor into the upper portion of the tank with considerable velocity.

Because of the substantial pressure within the generator and the relatively low pressure in the tank, the solvent vapor initially rushes with great velocity within the tank, and being directed outwardly and upwardly from the pipes 9, the vapor stream strikes portions of the walls of the tank, its momentum enabling it to be deflected to the upper sides and ceiling thereof.

By reason of its greater density than that of the air or gas content of the tank and its high velocity, the vapor acquires a substantial momentum sufficient for it to overcome the resistance of and displace the air in the upper portion of the tank and reach the upper sides and ceiling thereof where, upon condensing thereon it liquefies the hydrocarbon deposit. If the vapor lacks this momentum, its relatively greater density will force it to the bottom of the tank, leaving the top portion untouched.

The vapor initially delivered into the upper portion of the tank, as aforesaid, forms in effect a blanket over the air therein exerting a downward pressure thereon.

The cushion of air resulting from this pressure is an essential feature, since without its retarding influence on the layer or blanket of vapor initially delivered into the tank, the vapor would settle quickly to the bottom without cleaning the sides of the tank on its downward path. Without this slowing up of the settling action, an impracticable amount of vapor would be required for effective cleaning. The vapor of said initially formed upper layer or blanket settles slowly, cleaning the sides of the tank as it goes and displacing the air from the bottom of the tank, causing it to rise to the top of the tank. Although the vapor is heavier than the gas or air, the cushion of air initially displaced by the solvent vapor has a certain retarding influence on the settling of the vapor, so that the latter has sufficient time in its contact with the upper sides and ceiling surfaces of the tank to condense and clean the said areas, after which the vapor in the upper portion of the tank is displaced by the lighter air.

The solvent vapor is initially admitted as above described to the interior of the tank through valve 14 until a back-pressure is produced, or until, after delivering vapor to the tank for a few minutes and the vapor still being under pressure within the tank, I close vapor feed valve 14 and open vent valve 8xx. The hydrocarbon gases and air driven up to the top of the tank by the solvent vapor are thus allowed to escape through the vent pipe 8x until it appears, as by observation, that the solvent vapor is also beginning to escape, whereupon vent valve 8xx is closed.

The sudden release of the air and hydrocarbon gases by this quick venting creates a turbulent action on the vapor which has not condensed on the metal surfaces in the upper parts of the tank, causing an effective redistribution of the same for added tank surface condensation.

At this point, the tank is fairly free of air and hydrocarbon gases.

In usual cases, after venting, I open the inlet valve 14 from the generator and admit a further charge of solvent vapor until the pressure within the tank is again built up; or until the pressure in the generator drops to a few pounds. The vapor thus admitted reaches all the metal surfaces of the tank, condensing thereon and liquefying the hydrocarbon oil deposit which flows to the bottom of the tank.

Vital parts of the procedure according to my invention are the use of vapor at suitable initial pressure from the generator and the subsequent steps whereby this vapor is initially delivered into an upper portion of the tank so as to be condensed on the under ceiling and the extreme upper parts of the walls. If the vapor be initially introduced into the lower part of the tank, the pressure of air accumulated in the upper part of the tank prevents the vapor from reaching and condensing on said upper parts.

Another vital part of the method is the complete venting of the air and hydrocarbon gases from the tank which follows the initial delivery of vapor thereto.

An advantage of this method is that due to the venting of air and hydrocarbon gases and the use of considerable pressure from the generator, the vapor penetrates all non-water tight plate laps or similar construction of interior strength members which, if not cleaned, would be potential sources of hydrocarbon gases.

By the above described successive steps of my method, ship's tanks and other tanks of very large capacity may be thoroughly cleaned by delivering thereto the solvent vapors through a single conduit and through suitable branch conduits within the upper portion of the tank. Said branch conduits may be of such size as readily to be inserted into the tank through a manhole of ordinary size.

As a result of employing the above-described method, the interior wall surfaces, baffle plates, rivet heads and other surfaces exposed inside a tank will be entirely freed of deposits; and surfaces exposed within the tank will be cleaned to an extent not realized by any other form of cleaning method known to me.

While I have mentioned dislodging deposits of hydrocarbon oils and removing gases and the dislodged or liquefied oily deposits, the method is equally applicable to dislodging deposits of vegetable or animal oils and removing gases, if any, from inside the structure to which my method is applied.

It is my theory that the use of the solvent vapor under pressure causes or aids the vapor to penetrate and be absorbed into the residue in the tank bottom, which reduces the viscosity of said residue to a point where it can be removed by a pump.

After sufficient vapor has been supplied to the tank and adequate condensation and cleaning action thereof on surfaces inside said tank have taken place, the pump may be operated to withdraw deposits of substances liquefied and carried to the base of the tank and, if desired, to withdraw the remaining gases from the interior thereof.

Prior to pumping, during pumping, and after pumping, in any event preferably after substantially all the liquefied deposit has been withdrawn, air or steam may be delivered into the tank to force gases out through a suitably controlled vent which may be arranged so as to discharge into a solvent recovery condenser. This reduces the amount of pumping needed to clear the tank of gas. Also, a supply of water substantially equivalent in volume to the pump capacity may progressively be admitted to the base of the tank as the pumping proceeds, which raises the liquefied deposit above the bottom surface and thus facilitates the removal thereof by said pump.

In carrying out the process for gas-freeing, it is preferable to first pump out oil from the tank should the latter contain such oil.

When vapors of solvents of the class of carbon tetrachloride and trichlorethylene are introduced into a tank containing hydrocarbon gas in a manner as above described, the heavy vapor will displace the hydrocarbon gas within the tank, and being noninflammable may permit repairs to be made from the exterior of the tank by acetylene torch if need be, and without undue hazard.

I claim—

1. A method of cleaning surfaces exposed within a tank which comprises heating an oil solvent characterized in its vapor form as heavier than air to form a volume of the solvent vapor under pressure, initially delivering said solvent vapor into the top portion of the tank displacing thereby a horizontal layer of the air at the top of the tank while leaving the body of air in the tank below the solvent vapor as a means for retarding the speed of descent of the vapor, continuing said initial delivery of the solvent vapor to build up pressure within the tank, and after a time interval sufficient to permit the air to rise to said top portion of the tank above the descended heavier solvent vapor, discharging the said air from the tank by relieving the pressure therein.

2. A method according to claim 1 and followed by the step of delivering additional solvent vapor into the top portion of the tank to form temporarily therein an upper layer of solvent vapor of higher density than the vapor or air and vapor mixture remaining after relieving the pressure therein.

3. The method of cleaning surfaces exposed inside a walled structure adapted when closed to confine gas, as air or a mixture of air and other gases, which method includes the steps of delivering into an upper portion of the interior of such a structure while closed a volume of oil solvent vapor heavier than said gas at a rate to initially displace from said upper portion a corresponding volume of said gas confined therein and to form in place of said displaced gas an upper layer of vapor which initially and temporarily contacts with surfaces positioned in said upper portion of the interior and overlies and exerts pressure upon a lower layer of said gas, and said lower layer of gas initially and temporarily retards descending movement of the vapor constituting said upper layer, stopping the delivery of vapor to said interior, and freely venting gas from said interior causing turbulent movement of the then uncondensed vapor therein and redistribution of said vapor within said interior along with condensation of portions of said vapor on said surfaces to be cleaned.

4. The method according to claim 3 followed by the step of delivering additional solvent vapor into said upper portion of the interior of said walled structure to form temporarily therein an upper layer of solvent vapor heavier than the vapor or mixture of gas and vapor remaining within the walled structure after the aforesaid venting of gas from the interior thereof.

THOMAS P. McFADDEN.